July 26, 1966

R. E. O'BRIEN 3,262,477

DEBARKING APPARATUS

Filed Dec. 26, 1963

INVENTOR
Richard E. O'Brien

BY
ATTORNEY

July 26, 1966  R. E. O'BRIEN  3,262,477

DEBARKING APPARATUS

Filed Dec. 26, 1963  5 Sheets-Sheet 5

INVENTOR
Richard E. O'Brien

BY *Robert Neel Roley*
ATTORNEY

United States Patent Office 3,262,477
Patented July 26, 1966

3,262,477
DEBARKING APPARATUS
Richard E. O'Brien, Manitowoc, Wis., assignor to Manitowoc Shipbuilding, Inc., Manitowoc, Wis., a corporation of Wisconsin
Filed Dec. 26, 1963, Ser. No. 333,326
17 Claims. (Cl. 144—208)

The present invention relates to debarking apparatus and more particularly to an improved rotary cylindrical multi-course drum or shell structure in which the bark of logs, or the like, inclusive of pulpwood logs, is removed in order to condition the logs for use in paper making or other similar industries.

Apparatus for debarking logs in preparation for use as wood pulp must of necessity, when all production and cost features are considered, as for example the diameters, lengths and weight of the logs being processed, the time factor, costs of the operation per log, etc., must be exceptionally large, heavy and generally massive.

Accordingly, as a practical transportation matter it is impractical to fabricate and finally entirely assemble such apparatus, as a unitary single structure, at the place of original manufacture and then transport the apparatus to a remote or distant field location of use.

By way of example, apparatus of this invention, which is currently manufactured as one embodiment of this invention, which is herein disclosed, described, illustrated and shown, has a steel alloy debarking drum which alone has an overall length greater than 68 feet, a diameter greater than 15 feet and a wall thickness measuring up to approximately 1½ inches, with the drum being supported on two sets of rollers each of which is approximately 5 feet in diameter.

Therefore, it is an object of this invention, in the manufacture of structures or apparatus of the type under consideration, to provide a manner to fabricate the component structural parts of the apparatus and partially assemble portions of the component parts thereof together as completed sections or units of such size and weight as can be practically handled and safely transported from the location of manufacture and then finally assemble the entire structure at the generally distant field site where same is to be used.

In the past, riveting and bolting of the component sections or parts together has been mainly depended upon, requiring the use of high cost and high maintenance component structural parts to render the whole structure capable of functioning efficiently in view of the final assembly method or means employed.

It is therefore a primary object of this invention to provide a mechanism, method and apparatus for debarking logs comprising a rim or shell structure, capable of relatively easy fabrication at the location of use, which is of large heavy and massive size, and which when finally assembled is of unitary and rigid construction throughout.

It is another object of the invention to provide rotary debarking drum apparatus formed of courses or sections capable of construction in terms of exceptionally large diameters and lengths and well-fabricated together as a unitary and monolithic structure free of any stress concentrations, component loosening and weakening effects, such as occur when conventionally riveted or bolted constructions are employed.

It is yet another object of the invention to provide rotary debarking drum apparatus formed of a plurality of abutting heavy plate shell sections or courses welded into a single, unitary or integral construction free of any joint discontinuities which cause stress concentrations and fatigue failures.

It is still another object of the invention to provide a welded rotary debarking drum formed of multi-heavy plate shell sections or courses forming a single, unitary and rigid integral structure that provides improved shock absorption, by the greater mass of the drum structure and load distribution, caused by the weight and impacts and movements of logs while being debarked, thereby providing less shock transmission to any supporting roller and driving arrangement employed with the drum.

It is still another object of the invention to provide a rotary cylindrical debarking drum or shell having an inner cylindrical surface which extends substantially the full length thereof whereat there is provided relatively closely spaced, substantially longitudinally extending log lifters integrally secured on the inner cylindrical surface so that the close lifter spacing thereby protects most of the shell surface from contact and damage by the log load and also provides great local strength as well as improved drum shell girder strength.

It is also another object of the invention to provide a rotary debarking drum having a substantially cylindrical shell provided with a plurality of discontinuous, inverted, radially extending V-shaped and rounded apex lifter or rib members which are each welded onto the inner cylindrical surface of the shell and in whch certain end portions of the rib members are cut back and slope longitudinally to provide additionally accessible securing surfaces to provide greater rib attachment and shell strength.

It is moreover, another object of the invention to provide a substantially cylindrical unitary, multiple section, welded rotary debarking drum having a plurality of radially tapered bark discharge slots formed in some of the sections and opening to the exterior thereof for ready discharge of bark, dirt and other debris therefrom, the location of the slots and the slot length providing maximum bark discharge areas with minimum drum hoop stress.

It is yet a further object of the invention to provide a rotary debarking drum shell having an inner substantially cylindrical surface with a plurality of uniformly spaced alternating longitudinally extending rows of bark discharge elongated slots and log lifter members, the lifter members being continuously welded to the drum shell inner surface throughout the lengths thereof to assure adequate log debarking action and proper drum shell reinforcement.

It is a still further object of the invention to provide a rotatable debarking drum with an improved discharge mechanism at one end thereof for controlling at will the discharge of debarked logs from the drum together with the continuous and free discharge of bark and other log debris.

It is also a further object of the invention to provide a debarking drum with improved discharge mechanism which enables the discharge of debarked logs to be controlled wherein the discharge mechanism is provided with a portion that prevents such debarked logs from being passed to the discharge mechanism while continuously enabling the discharge of bark together with other debris from within the drum.

Yet still a further object of the invention is to provide an improved discharge mechanism for a rotatable debarking drum with the discharge mechanism being operably controlled to vary the quantity of debarked logs which may be discharged therefrom while enabling the continuous discharge of the bark and other debris from within the debarking drum.

It is also a further object of the invention to provide improved discharge mechanism for a rotatable debarking drum wherein the discharge mechanism is provided with a part that is adjustably disposed for selectively controlling the discharge of debarked logs from the drum and another part of the discharge mechanism enabling the continuous discharge from the drum of bark or other debris.

It is moreover a further object of this invention to provide a relatively large rotary debarking drum which is initially constructed of a plurality of separate portions comprised of plural sections or courses, conveniently shipped to a field location and readily installed and assembled there by weld-connecting the sections or courses together in end-to-end relation to define a unitary, integral and relatively rigid cylindrical drum structure.

It is yet a further object of the invention to provide a relatively rigid rotatable debarking drum of variable length by constructing it of any desired multiples of separate longitudinal sections or courses integrally secured together in abutting end relationship.

It is another and further object of the invention to provide a rotatable debarking drum having a series of longitudinal sections or courses which may be rigidly and readily secured together in end-to-end relation at a field installation and when any of the sections or courses are in need of replacement it may be readily effected at the field installation with resulting saving in operational time and expense.

It is also a further and another object of the present invention to provide a rotary debarking drum structure having a substantially cylindrical shell with longitudinally spaced coaxial tire elements of massive, deep cross section of welded construction formed integral with the drum to effect low bending stresses in the tires and the elimination of all tire bolt loosening and tire shimming problems heretofore encountered.

It is likewise another object of the invention to provide a rotary debarking drum having a cylindrical shell with tire elements thereon having a deep section configuration which by their permanent rigid weld connection to the drum shell reinforce and maintain the roundness of the cylindrical shell.

It similarly is another object of the invention to provide a rotary debarking drum having a substantially cylindrical shell with load-bearing tires rotatably supported at spaced longitudinal locations adjacent the end sections thereof on large diameter roller arrangements with at least a pair of relatively large plain rollers at each drum shell tire support location wherein the large size of the rollers contributes to reduction in stresses in both the rollers and tire members.

It is also another object of the invention to provide a rotatable debarking drum having coaxially encircling tires secured thereto and in which a plurality of spaced roller support arrangements are provided upon which the load transmitting coaxial tire elements of the drum are rotatably supported on relatively large roller arrangements including laterally positioned and thrust rollers engaging vertical side flanges of one of the tires to minimize end thrust loading on support roller arrangements and their bearings and to eliminate the need of high-maintenance flanged rollers.

It is another and further object of the invention to provide a rotatable debarking drum with a welded segmental co-axial sprocket member supported thereon by a plurality of spaced arcuately extending mounting membrs integrally connected by welding to the outer cylindrical surface of the drum.

These and other objects of the invention will be apparent from a study of the specification following taken with the drawings which together show, illustrate, describe and disclose the preferred embodiment of the invention and what is now considered to be the best mode of practicing the principles thereof. Still other embodiments or modifications of the invention may be suggested to those having the benefit of the teaching herein and all such other embodiments or modifications are intended to be reserved as they fall within the spirit and scope of the subjoined claims.

In the drawing:

FIGURE 8 is a vertical section of the log lifter taken along the line 8—8 of FIGURE 6.

Figures 1, 4, 6, 7:
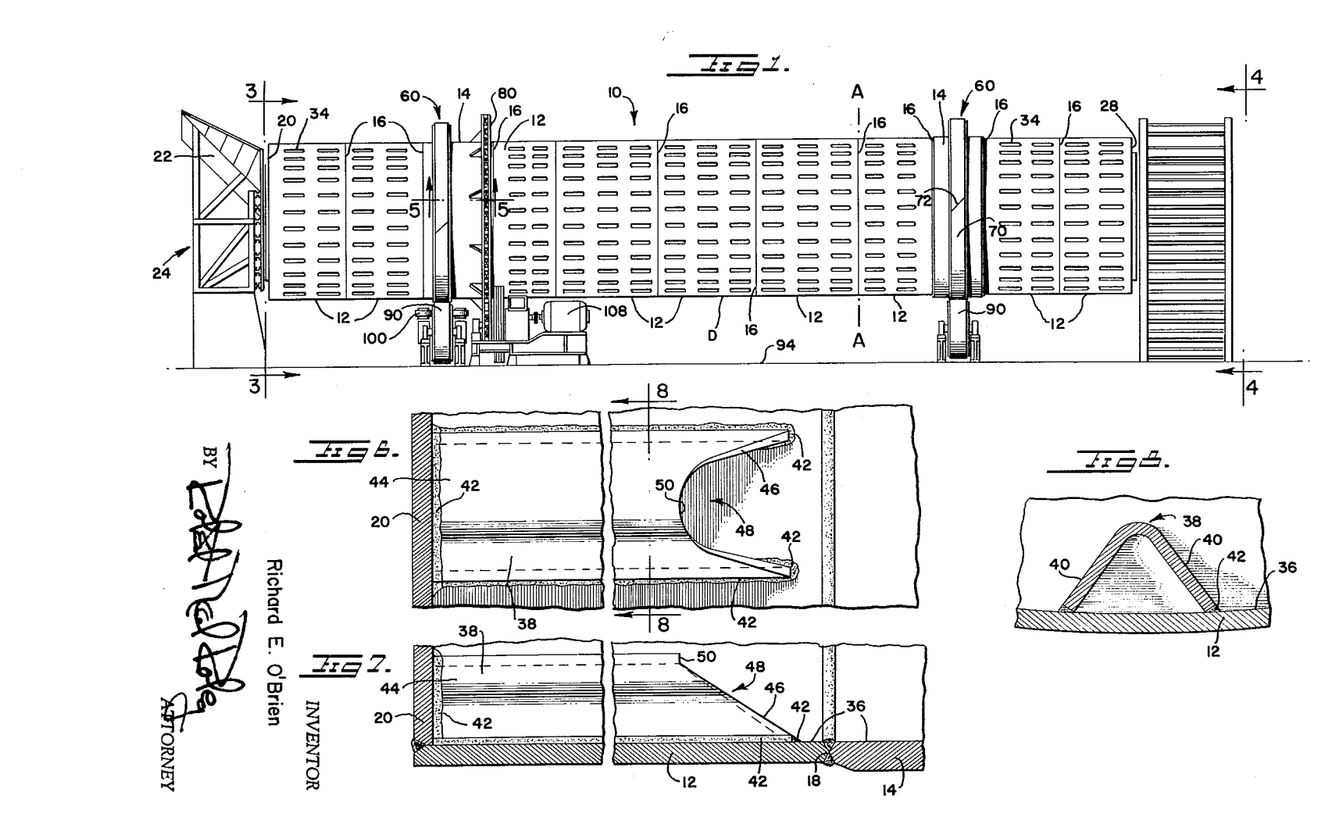
FIGURE 1 is a side elevational view of an elongate rotary debarking drum apparatus having log feeding and log discharge control structures at its opposite respective end portions thereof.
FIGURE 4 is an enlarged end elevational view of the debarking drum apparatus taken along the line 4—4 of FIGURE 1 showing the log discharge control structure with a portion thereof being broken away and shown in section for clarity to illustrate log discharge control gates of the debarking drum apparatus.
FIGURE 6 is a view taken along the line 6—6 in FIGURE 3 showing in plan on an enlarged scale a log lifter which is secured to the inner cylindrical surface of the debarking drum.
FIGURE 7 is a view taken along the line 7—7 in FIGURE 3 showing a log lifter similar to that of FIGURE 6, in side elevation on a corresponding enlarged scale.

Attention is now directed to FIGURE 1 of the drawing wherein there is illustrated apparatus 10 for debarking logs or the like. The apparatus 10 comprises an elongate, rotatably supported drum or shell structure D of preferably cylindrical configuration, formed of a plurality of separate and independent cylindrical sections or courses 12 and 14 positioned in end-to-end longitudinally abutting relationship relative to each other with the courses or sections 12 and 14 being rigidly secured together at jointure lines 16 by means of double beveled welding 18 or the like, as shown for example in FIGURE 7, to form the single unitary and rigid elongate drum structure D.

All of the drum sections or courses 12 and 14 have cylindrical inner walls each of which have substantially the same inner diameter forming an inner cylindrical chamber C, the two longitudinally spaced cylindrical sections 14 being imperforate and of slightly greater thickness than the sections 12 with a resulting greater outer diameter for a reason to be later explained.

Figure 3:
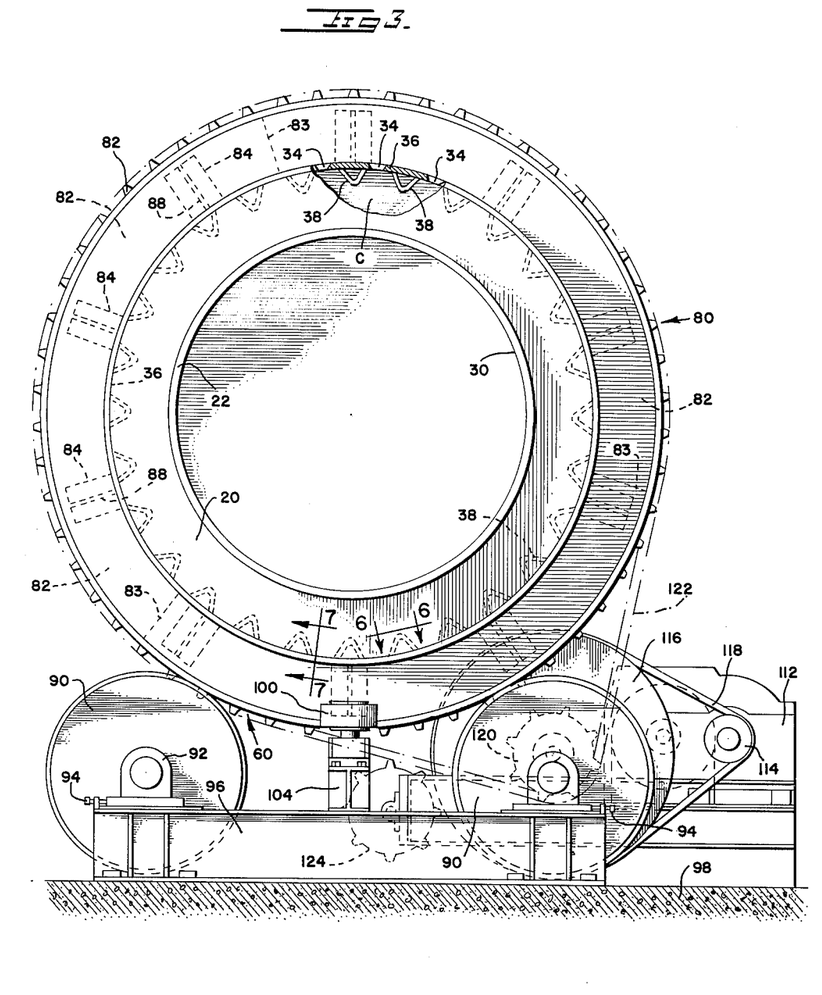
FIGURE 3 is an enlarged end elevational view of the debarking drum apparatus taken along the line 3—3 of FIGURE 1 showing the log feeding structure and partly broken away to show a portion of the interior of the drum apparatus in section for clarity of detail.

Adjacent the left end of the rotary drum D, as viewed in FIGURE 1, there is provided an end wall 20 having a circular log intake or admission opening 22, as shown in FIGURE 3, through which logs to be debarked are received into the cylindrical chamber C from a log chute 24 suitably supported by means 26, while adjacent the other end of the drum D there is provided an end wall 28 for the drum chamber C having an opening 30 for the discharge of debarked logs, with the opening 30 being variable and closable at will by improved power actuated means 32 to be more fully and later described.

Figure 2:
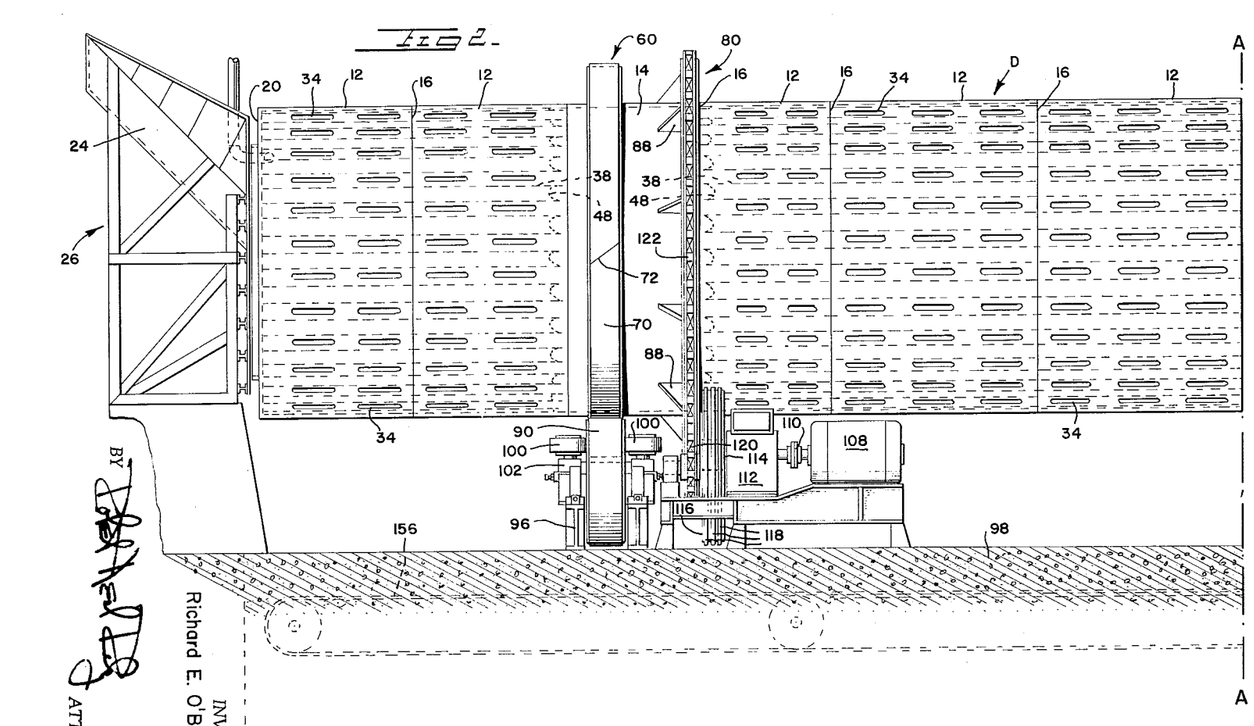
FIGURE 2 is an enlarged side elevational view of the left approximate half portion of the apparatus extending to the line A—A in FIGURE 1.

As shown in FIGURES 1 to 3 all of the cylindrical sections 12 of the debarking drum or shell D are provided throughout the entire combined peripheral surface area thereof with a plurality of uniformly spaced rows of elongate and radially outwardly tapered slots or perforations 34 for facilitating in the passage of the bark, dirt, debris and other material therethrough in order that same may be removed from within the inner cylindrical chamber C of the drum D during the debarking process. The slots 34 are preferably arranged in a series of equally spaced circumferentially aligned and equally spaced longitudinally extending and aligned rows relative to the drum D with the slots 34 being equally spaced apart relative to each other.

Figure 2A:
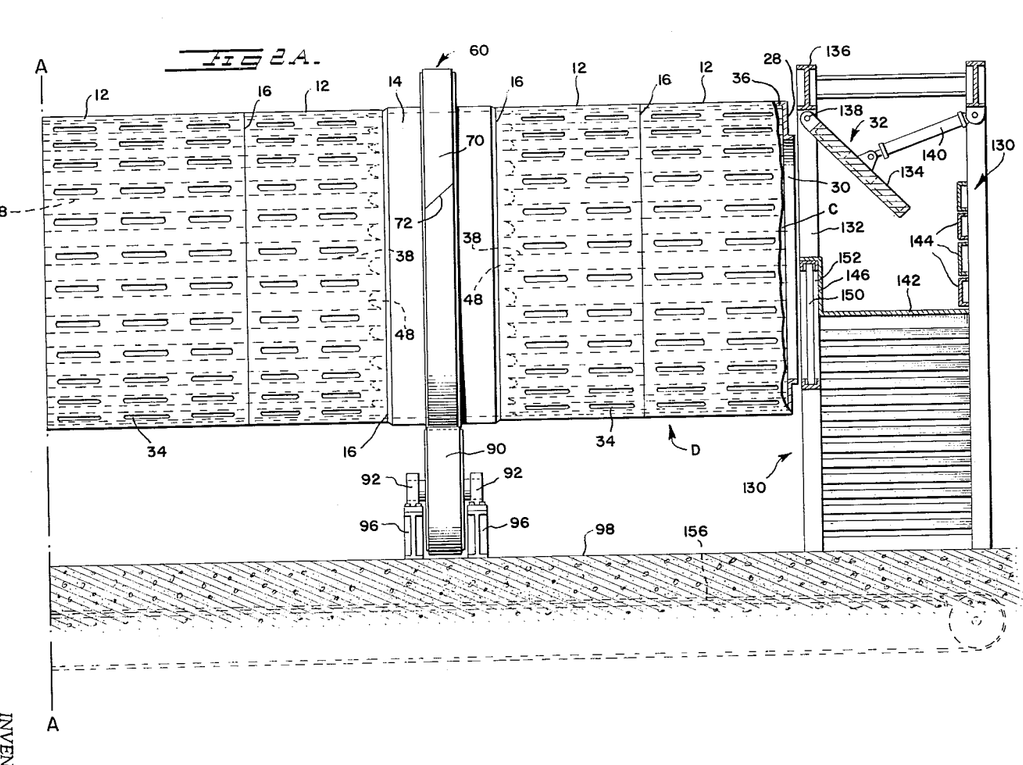
FIGURE 2A is an enlarged side elevational view of the right approximate half portion of the apparatus extending to the line A—A in FIGURE 1.

On the longitudinally spaced cylindrical portions of the inner surface 36 of the cylindrical chamber C of the debarking drum D, as comprised by the grouped abutting and rigidly connected perforate cylindrical shell sections 12, each group separated from each other by the two imperforate cylindrical sections 14, are mounted a plurality of longitudinally extending and circumferentially spaced apart elongate and radially inwardly projecting hollow log lifter or rib members 38, the lifters 38 being positioned midway between each adjoining pair of longitudinally extending rows of elongate discharge slots 34, as clearly shown in FIGURES 2, 2A and 3. As is likewise apparent from these figures the lifters 34 have the end portions terminating closely adjacent the respective imperforate cylindrical shell sections or courses 14 and in direct abutting relationship to the respective end walls 20 and 28, note FIGURES 6 and 7.

The elongate, radially inwardly projecting and longitudinally extending log lifters 38 are each substantially of inverted V-shape in vertical cross-section and have a rounded apex as illustrated. The free end of each leg portion 40 of the log lifting rib 38 is rigidly secured by means 42 such as welding or the like, to the inner cylindrical surface portion 36 of the cylindrical perforate courses or sections 12 of the shell D, as indicated in FIGURES 6–8, thereby forming a hollow rib structure extending generally radially toward the longitudinal axis of rotation of the drum D. Portion 44 of the lifters 38, which extend from the respective end walls 20 and 28 of the drum chamber C to adjacent the thicker walled cylindrical imperforate sections 14 of the drum D, are disposed in direct engagement or contact with the respective inner end walls 20 and 28 of the drum chamber C and rigidly connected throughout the substantially V-shaped peripheral edge portion thereof to the inner cylindrical wall 36, as shown in FIGURES 6 and 7 and along an extension 46 by the weld means 42. Opposite end portions 48 of the lifters 38 which are adjacent the imperforate cylindrical drum section 14, are actually sloped, inclined, or cut back with the uppermost portions 50 of the sloping end portion 48 extending radially of the drum axis. The sloping end portion 48 of the lifters 38 enable the weld means 42 which connects each of the lifter leg portions 40 to the cylindrical inner drum chamber surface 36 to extend an appreciable distance around the respective end of each leg portion 40 and along the inner edge thereof inside the hollow lifter 38, as shown in FIGURE 6 to thereby materially increase the strength of the connection of the exposed inclined end portions 48 of the lifter leg portions 40 to the inner chamber surface 36 of the drum or shell D.

The elongate, intermediate log lifters or ribs 38, which are mounted to the perforate cylindrical courses 12 which are located centrally of the drum D between the imperforate courses 14 whereat the lifters 38 are positioned thereon and extend of the perforate end cylindrical courses 12 which define the intake and discharge ends of the drum D. The sole difference between the lifters 38 of the central and intake and discharge portions of the drum D is that since both end portions of the centrally disposed elongate log lifters 38 lie adjacent the imperforate drum sections 14, both end portions of each of these lifters 38 are sloped or cut back and weld-connected to the drum chamber inner surface 36 in a manner corresponding identically with the sloped rib ends 48 of the lifter ribs 38 on the drum end portions as shown in FIGURES 6 and 7.

As is clearly evident from the showing in FIGURES 2, 2A and 3 the hollow log lifters or ribs 38 function not only for the purpose of lifting logs for debarking during the rotation of the drum or shell D, but in addition thereto provide further and highly desirable longitudinal reinforcement and rigidity for the drum D.

Figures 4, 5:
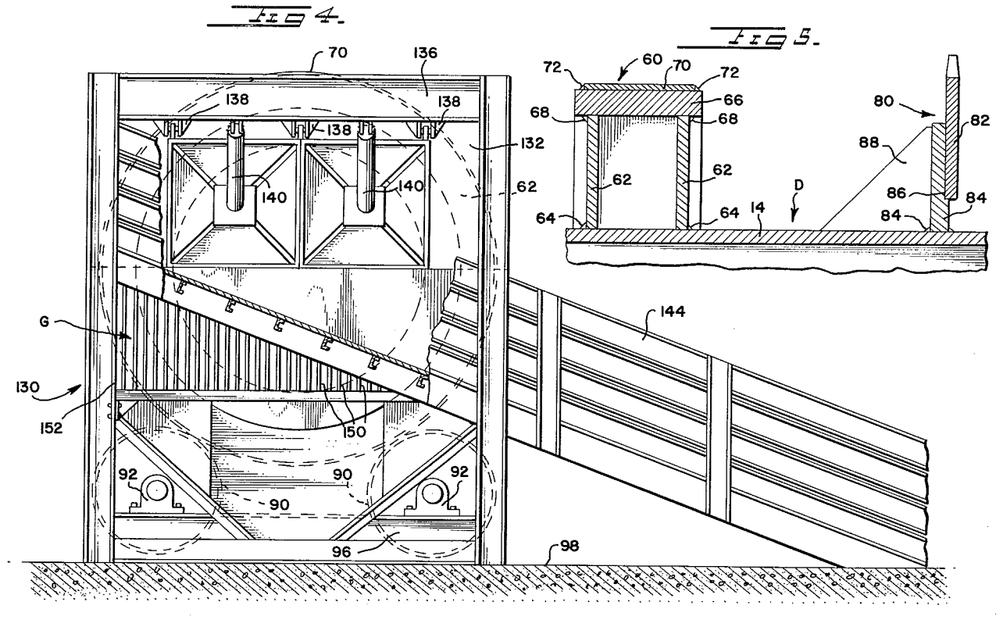
FIGURE 5 is a sectional view taken along the line 5—5 of FIGURE 1 showing details of the tire and drive sprocket structures on the rotatable debarking drum.

For enabling the rotation of the drum D each of the two longitudinally larger diameter imperforate cylindrical sections or courses 14 is provided with an encircling concentric "girth" type tire structure 60 of massive construction secured to each of the drum sections or courses 14. Each of the tire structures 60, which are substantially identical, as shown in FIGURE 5, of the drawing comprises a pair of longitudinally-spaced web-like ring members 62 rigidly mounted on and secured substantially at right angles to and in encircling relationship to the respective imperforate drum section 14 by a continuous weld connection 64 to form radial tire webs which are thus integrally formed with the drum D. A relatively massive drum support ring or flange member 66 of high strength steel is symmetrically mounted in encircling relationship on the two radial web-like rings 62 and rigidly and integrally secured thereto by continuous welding 68.

A relatively wide, replaceable tire rim member 70 of high strength and hardness, formed of alloy steel to resist wear, may in turn be mounted on and integrally secured to the flange member 62 by a continuous welded connection 72 on each of the sides or edges thereof. The rim member 70 may be preferably formed in three separate ring segments or sections with scarfed or diagonally abutted welded together end portions 72 for relative mounting ease in assembly or disassembly for replacement thereof when damaged or badly worn.

The tire rim member 70 may also be formed of other materials such as rubber or the like which may be secured in any desired and suitable manner to the support member 66 of the tire structure 60.

In the embodiment of the invention herein described and currently being manufactured, the tire rim member 70 alone is approximately 15 inches in width which is indicative of the massiveness of the welded tire construction. Further, the cross sectional depth of the tire structure 60, provided by the web ring members 62 and the unitary permanent continuous weld connection thereof to the drum D, provide the tire construction 60 with resultant low bending stress whereby the tire loosening and tire shimming problems formerly encountered in bolt-connected construction are eliminated.

While preferably only two tires structure 60 are employed in the embodiment here described it is to be understood that any desired number may be used, the number being dependent on various factors, such as drum length, diameter, shell thickness, weight loading inclusive of the logs to be debarked, etc.

Also mounted on one of the two greater diameter imperforate drum sections or courses 14, and preferably the one to the left in FIGURE 1, is a driven sprocket shell ring structure 80 for receiving a driving tongue to rotate the drum or shell D. The sprocket wheel ring structure 80, comprises a plurality, preferably three, circular coplanar plate segments 82 abuttingly welded together by means 83 to form a unitary sprocket ring which extends concentrically of and entirely circumferentially around the drum or shell section 14 and in radially spaced relationship to the outer periphery of the latter and in parallel relationship to the tire structures 60. The sprocket wheel 80 formed by the welded-together sprocket segments 82 is supported on a plurality of circumferentially spaced supporting plate members 84 of relatively short length integrally secured by welding to and around the outer periphery of the respective imperforate drum section or course 14. The plates 84 are each provided with a rabbet or recess 86 in which the sprocket ring 80, formed by the segments 82, is mounted and rigidly secured thereto by welding. As shown in FIGURE 5, each supporting plate member 84 is laterally braced by a longitudinally extending triangular reinforcing flanges 88 rigidly connected by welding to the side of the plate 84 and the periphery of the respective drum section 14.

The cylindrical drum D is rotatably supported by the tire structures 60 being each mounted or positioned on a pair of large diameter support driving rollers 90 positioned in transverse spaced relationship on each side of a vertical plane passing through the longitudinal axis of the drum D. The support rollers 90 are each freely rotatable in self-aligning bearings 92 and are adjustably positionable by means of adjusting screws 94 on a suitable but preferably structural steel load support structure 96 which in turn may be supported by a reinforced concrete foundation 98.

The drum tire structure 60 at the left or log intake end of the drum D in FIGURE 2 is laterally engaged at each side thereof and midway between the support rollers 90 by a lateral thrust roller 100 freely rotatably supported in a thrust bearing 102 mounted on suitable but preferably structural steel support members 104 bolted to the load bearing support structure 96. Each of the thrust rollers 100 rotatably engages a respective machined side or bearing face of the tire structure flange member 66 preferably at a location lying in the vertical plane of the axis of the drum D.

The drum D is rotatably driven by a source of power 108, such as a motor or engine of any desired type coupled by means 110 to a speed reducing gear 112 which drives member 114 comprising part of a second member 116 driven by the member 114 through means 118. The member 116 drives a sprocket wheel 120 which rotatably drives the cylindrical drum D by means of a sprocket chain 122 drivingly engaged with the driven sprocket wheel ring 80 rigid with the drum. An adjustable idler sprocket 124 mounted on the support structure 96 and engaging the sprocket chain 122 is provided to effect proper tension for the sprocket chain 122.

Mounted on the foundation or base 98 and positioned in close proximity to and extending across the discharge end 30 of the debarking drum D is a combined log discharge control gate and log discharge ramp or chute support frame structure 130.

The frame support structure 130, noting particularly FIGURES 2A an 4 of the drawing, is preferably fabricated of structural steel, and provides a generally recangular opening 132 which extends across the approximate upper half of the circular discharge opening 30 of the drum D in close proximity thereto. The size of the frame opening 132 is such as to extend well above and laterally beyond the limits of the upper half of the drum discharge opening 30. A relatively heavy gate structure 134, comprising the closure means 32 previously referred to, is hinged by means 138 to an upper portion 136 of the frame 130 with the closure means 130 being of a size sufficient to extend across and enclose the upper half of opening 30. The gate structure 134 is movable between an open position, as shown in FIGURE 2A, to a vertical position substantially closing the upper semicircular portion of drum discharge opening 30 by power means 140, such as a cylinder or ram unit actuated and controlled by means not shown.

Mounted on the frame support structure 130 and extending in an inclined position across the lower cylindrical half of the log discharge opening 30 at an actute angle relative to the foundation 98 is a discharge log chute or ramp 142 of a length sufficient to receive ground support at the lower end from the foundation 98. The discharge chute or ramp 142 is provided with suitable log deflection and guide members 144 to assure safe and proper guidance of the logs from the drum discharge opening 30 to the foundation 98 or ground.

As illustrated, a side wall portion 146 of triangular configuration forms a part of the log ramp 142, and is positioned below and adjacent the opening 132 of the frame structure 130 and is solid or imferforate to prevent bark chips and other debris from being discharged onto the log ramp or discharge chute 142.

Mounted directly below the frame opening 132 and extending across the entire width thereof and inclusive of the lower half of the drum discharge opening 30 are a plurality of closely spaced, vertically positioned bar members 150 fixedly mounted in a second opening 152 of the frame structure 130 directly below and coplanar with the opening 132 thereof to form a bark and debris discharge grating G. The spacing of the vertically positioned bar members 150 of the grating G is sufficiently large to permit continuous discharge of only pieces of log bark, dirt and other small debris therethrough from the end discharge opening 30 of the drum D but too small to permit the logs to pass therethrough.

A horizontal conveyor belt system 156 (FIGURES 2 and 2A) may be mounted in the foundation or base 98, if desired, to remove bark and the other debris that is discharged and dropped from the elongate bark discharge slots 34 in drum courses 12 and from the drum end discharge opening 30 and past the vertically spaced bar members 150 of the grating G.

In the operation of the apparatus, the motor 110 is first energized to continuously rotate the cylindrical drum D at a relatively slow rotational speed by means of the reduction gearing 112–118 and the drive transmitted therefrom by the drive sprocket 120 to the chain 122 and the driven ring sprocket 80 which is rigid with the drum D. The logs to be debarked are brought to the drum entry chute 24, by any suitable means such as by a belt conveyor system, whereat they slide down the chute 24 under the action of gravity and enter the drum through the admission opening 22.

Assuming that the drum D is being rotated clockwise in FIGURE 3, the log lifters 38, through frictional contact with the logs in the drum chamber C cause the logs to be picked up from the lower part thereof and rotated through a portion of at least each revolution of the drum D whereby, through the action of gravity, the logs fall away from the log lifters and tumble about and down within the drum chamber C, this cycle of log movement being continuous with corresponding rotation of the drum D. As the logs frictionally rub against the lifters 38 and with each other during their chaotic, multidirectioned and gyratory movements, as the drum D continues to rotate, the bark material and any debris carried by the logs is thus removed therefrom and discharged through the elongate, outwardly tapered drum slots 38 and past the vertical bars 150 of the discharge grating G at the drum discharge opening 30.

As additional logs are admitted to the drum chamber C through the log admission opening 22 they act by the pressure against the logs that are already within the chamber, which have been rotated and tumbled a sufficient time to completely debark and clean them, to push the latter towards the discharge end opening 30 of the drum chamber C even though the logs which are being pushed along also continue to be lifted and frictionally scraped by the lifters 38 and further rubbed against each other by the rotation of the drum D. As the logs frictionally rub against the lifters 38 and with each other during their chaotic, multi-directioned and gyratory movements, as the drum D continues to rotate, the bark material and any debris carried by the logs is thus removed therefrom and discharged through the elongate, outwardly tapered drum slots 38 and past the vertical bars 150 of the discharge grating G at the drum discharge opening 30.

As additional logs are admitted to the drum chamber C through the log admission opening 22 they act by the presence against the logs that are already within the chamber, which have been rotated and tumbled a sufficient time to completely debark and clean them, to push the latter towards the discharge end opening 30 of the drum chamber C even though the logs which are being pushed along also continue to be lifted and frictionally scraped by the lifters 38 and further rubbed against each other by the rotation of the drum D.

When debarking of a given load of logs is completed the power cylinders or jacks 140 are actuated to open the discharge gate 134 to the position illustrated in FIGURE 2A to allow the debarked logs to be forced out through the upper portion of the drum discharge opening 30 and the adjacent frame opening 132 controlled by the gate 140 and then move onto the ramp 142 for descent to ground level. If desired, any form of roller, belt or other type conveyor may be mounted on the ramp structure 142 to aid in the descent of the debarked logs if desired.

While the invention has been described, disclosed, illustrated and shown in terms of a preferred embodiment or modification it has assumed in practice, the scope of the invention should not be deemed to be limited by the precise embodiment herein shown, described, illustrated and disclosed, such other embodiments or modifications being intended to be reserved as they fall within the scope of the claims herein appended.

I claim as my invention:

1. In apparatus for debarking logs, the combination of,
   substantially cylindrical shell structure defined by a plurality of end-abutted elongate courses connected together to form a generally cylindrical chamber of substantially uniform diameter throughout the full longitudinal extent thereof,
   said structure having at least two spaced imperforate shell courses disposed intermediate the perforate shell courses with said imperforate shell courses having a wall thickness greater than the wall thickness of said perforate shell courses,
   means for rotatably supporting said shell structure,
   lifter means mounted on the inner periphery of said perforate shell courses for lifting logs in said chamber as said shell structure is rotated,
   said lifter means comprising a plurality of circumferentially spaced generally longitudinally extending rows of radially inwardly projecting rib members rigidly mounted to only the internal periphery of said perforate shell courses,
   said shell structure having inlet and outlet passageways for the admission and discharge, respectively, of logs, and
   an arrangement for enabling the discharge of logs, bark and other debris from the interior of said cylindrical chamber,
   said arrangement comprising elongate slots extending generally longitudinally of said perforate shell courses at locations therealong which are intermediate adjacent rows of the lifter means.

2. The apparatus as set forth in claim 1, together with load bearing roller means carried by each of the imperforate shell courses and disposed thereon in engagement with the means for rotatably supporting the shell structure.

3. The apparatus as set forth in claim 2 wherein
   said roller means comprises tire means mounted on and encircling said imperforate shell courses,
   each of said tire means comprising pairs of circumferentially extending longitudinally spaced web-like means connected to each of said imperforate courses, and
   an annular flange member connected to each pair of said web-like means with an annular surface thereof being disposed concentric to the longitudinal axis of said shell structure.

4. The apparatus as set forth in claim 2 wherein
   said means for rotatably supporting said shell structure comprises at least a pair of support roller means spaced transversely to the longitudinal axis of said shell structure and positioned in supporting relationship relative thereto under each of said roller means, and
   thrust roller means mounted adjacent at last one pair of said support roller means for preventing movement of the drum structure in a direction substantially common to the longitudinal axis thereof.

5. The apparatus as set forth in claim 1, wherein
   the sides of said elongate slots are tapered in a converging direction toward the longitudinal axis of the shell structure.

6. The apparatus as set forth in claim 1, wherein
   said rib members extend substantially throughout the full longitudinal extent of the perforate shell courses and terminate in spaced relationship to the adjacent imperforate shell courses with the end edge portions of said rib members which are located adjacent said imperforate shell courses being angularly inclined therefrom.

7. In apparatus for debarking logs, the combination of,
   substantially horizontally disposed rotatably mounted elongate generally cylindrical shell structure having spaced apart log admission and discharge openings therein,
   means for rotatably supporting said shell structure,
   said shell structure comprising a plurality of end-abutted shell courses, two of which are generally longitudinally spaced from each other and provided with imperforate wall portions with the remaining shell courses of said shell structure being provided with apertures in the wall portions thereof, and
   elongate log lifter rib members mounted on the interior surfaces of said remaining shell courses in generally parallel rows which extend substantially throughout the full longitudinal extent thereof and project generally radially inwardly therefrom.

8. The apparatus for debarking logs as set forth in claim 7, wherein
   the end edge portions of said rib members which are located adjacent said inperforate shell courses are acutely angularly inclined away from said imperforate shell course.

9. The apparatus for debarking logs as set forth in claim 8, wherein
   said rib members are of substantially V-shape in cross-section, together with
   means for connecting the leg portions of the V-shaped rib members throughout the full longitudinal extent thereof to the inner peripheral surface of the perforate shell courses with the connecting means extending around the inclined end portions of the rib members and thence a distance into the space defined between the leg portions thereof,
   and means for connecting the end portions of the rib members to the end portions of the shell structure along a plane that is substantially normal to the longitudinal axis of the shell structure and throughout substantially the full peripheral extent of the V-shaped rib members.

10. The apparatus for debarking logs as set forth in claim 7, wherein
    the thickness of the wall portions of the imperforate shell courses is greater than the thickness of the wall portions of the perforate shell courses.

11. Log debarking apparatus of the type described comprising, in combination,
    elongate structure defining a substantially cylindrical chamber,
    means for rotatably driving said structure,
    intake means adjacent one end portion of said chamber and discharge means adjacent the opposite end portion thereof,
    said discharge means comprising
    an opening at said opposite end of the chamber,
    means for partially closing a portion of said discharge opening to provide passages for restricting the discharge of material therethrough while preventing the discharge of logs, and closure means operative to control the discharge of logs through the remaining portion of said discharge opening.

12. The log debarking apparatus as set forth in claim 11, wherein
said means for partially closing a portion of said discharge opening comprises
a plurality of spaced apart elongate bar-like members extending across the portion of the discharge opening, and
said closure means comprises gate-like means mounted for movement between positions for opening and closing the remaining portion of said discharge opening.

13. An arrangement for controllably discharging material from a chamber opening,
said arrangement comprising,
means for partially closing a portion of the opening for enabling material to pass therethrough, and
means for opening and closing the remaining portion of said chamber opening,
said means for partially closing the portion of the chamber opening comprising a plurality of elongate spaced apart substantially parallel members which are disposed about a segment of the chamber opening, and
said closure means comprises a stationary part which obstructs the discharge of material through the remaining portion of the chamber opening together with a movable part which is movable between portions whereat the remaining portion of the chamber opening is either open or closed.

14. An arrangement for controlling the discharge of material from a chamber having a substantially circular discharge opening therein,
said arrangement comprising,
a plurality of elongate substantially parallel members disposed across one segment of the circular discharge opening,
means mounted for movement between positions wherein another segment of the discharge opening may be either closed or open, and
means for maintaining closed a segment of the circular discharge opening which is intermediate the first segment and the another segment.

15. The arrangement as set forth in claim 14 wherein the another segment of the circular discharge opening is substantially a semi-circle in configuration.

16. The arrangement as set forth in claim 14, wherein the intermediate segment of the circular discharge opening is substantially pie-shaped in configuration.

17. In combination with an elongate debarking drum mounted for rotation about the longitudinal axis thereof and provided with a substantially circular discharge opening therein,
apparatus for controlling the discharge of debarked logs together with debris and other material such as bark through the substantially circular discharge opening of the drum,
said apparatus comprising,
discharge chute means disposed adjacent the discharge opening but exteriorly of the drum for receiving debarked logs,
said discharge means being inclined to a substantially horizontally disposed plane which may pass through the longitudinal axis of the drum and disposed between such plane and the periphery of the discharge opening,
a plurality of elongate relatively rigid members disposed in substantially parallel relationship relative to each other across that segment of the discharge opening which is defined by the inclined discharge chute means and the periphery of the discharge opening,
means permanently closing that part of the discharge means which is disposed intermediate the discharge chute means and such horizontal plane,
and means for opening and closing the remaining portion of the discharge opening of the drum.

References Cited by the Examiner

UNITED STATES PATENTS

| | | | |
|---|---|---|---|
| 1,228,374 | 5/1917 | Ross | 144—208 |
| 1,463,887 | 8/1923 | Guettler | 144—208 |
| 2,592,054 | 8/1952 | Mertz et al. | 144—208 |
| 2,684,092 | 7/1954 | Dick | 144—208 |
| 2,943,656 | 7/1960 | Wakeman | 144—208 |
| 3,020,943 | 2/1962 | Hjartsater | 144—208 |

WILLIAM W. DYER, Jr., *Primary Examiner.*

W. D. BRAY, *Assistant Examiner.*